US012643790B2

(12) United States Patent
O'Connell

(10) Patent No.: US 12,643,790 B2
(45) Date of Patent: Jun. 2, 2026

(54) CARBON NEUTRAL HYDROGEN PRODUCTION

(71) Applicant: Saudi Arabian Oil Company, Dhahran (SA)

(72) Inventor: John O'Connell, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 738 days.

(21) Appl. No.: 18/047,768

(22) Filed: Oct. 19, 2022

(65) Prior Publication Data

US 2024/0132349 A1 Apr. 25, 2024
US 2024/0228275 A9 Jul. 11, 2024

(51) Int. Cl.
| | |
|---|---|
| *C01B 3/48* | (2006.01) |
| *B01D 53/14* | (2006.01) |
| *B01D 53/26* | (2006.01) |
| *B01J 19/00* | (2006.01) |
| *B01J 19/24* | (2006.01) |

(Continued)

(52) U.S. Cl.
CPC ............ *C01B 3/48* (2013.01); *B01D 53/1425* (2013.01); *B01D 53/1475* (2013.01); *B01D 53/265* (2013.01); *B01J 19/0013* (2013.01); *B01J 19/245* (2013.01); *C01B 3/506* (2013.01); *C01B 3/52* (2013.01); *B01D 2252/204* (2013.01); *B01J 2219/00117* (2013.01); *C01B 2203/0255* (2013.01); *C01B 2203/0283* (2013.01); *C01B 2203/0415* (2013.01); *C01B 2203/0475* (2013.01); *C01B 2203/0495* (2013.01);

(Continued)

(58) Field of Classification Search
None
See application file for complete search history.

(56) References Cited

U.S. PATENT DOCUMENTS

| | | |
|---|---|---|
| 4,141,696 A | 2/1979 | Charles et al. |
| 2005/0121200 A1* | 6/2005 | Sivaraman .............. C01B 32/50 |
| | | 166/370 |

(Continued)

FOREIGN PATENT DOCUMENTS

| | | | |
|---|---|---|---|
| CA | 3138356 A1 * | 11/2020 | .............. B01J 35/40 |
| EP | 4140944 | 3/2023 | |

(Continued)

OTHER PUBLICATIONS

JP 2016037411A translation (Year: 2016).*

(Continued)

*Primary Examiner* — Michael Forrest
*Assistant Examiner* — Nicole Lee Quist
(74) *Attorney, Agent, or Firm* — Fish & Richardson P.C.

(57) ABSTRACT

A hydrocarbon stream is combusted within a reactor to produce soot and syngas. Sub-stoichiometric combustion of the hydrocarbon stream within the reactor converts at least 10% of the carbon in the hydrocarbon stream into soot. The syngas is mixed with a steam stream to produce a hydrogenation feed stream. A shift reactor converts at least a portion of the carbon monoxide and steam to carbon dioxide and hydrogen to produce a shifted gas stream. Water is separated from the shifted gas stream to produce a dehydrated gas stream. The dehydrated gas stream is separated to produce a hydrogen product stream and a recycle stream. The recycle stream is recycled to the reactor.

14 Claims, 3 Drawing Sheets

100A

(51) Int. Cl.
 *C01B 3/506* (2026.01)
 *C01B 3/52* (2006.01)
(52) U.S. Cl.
 CPC ................. *C01B 2203/0894* (2013.01); *C01B 2203/1235* (2013.01)

(56) References Cited

U.S. PATENT DOCUMENTS

2005/0261382 A1   11/2005   Keyser et al.
2022/0267147 A1*   8/2022   Ravikumar ............. C01B 3/384

FOREIGN PATENT DOCUMENTS

| JP | 2010084060 | | 4/2010 |
|----|------------|---|--------|
| JP | 2016037411 | A * | 3/2016 |
| WO | WO 2017096337 | | 6/2017 |

OTHER PUBLICATIONS

Svensson et al "Modeling of soot formation during partial oxidation of producer gas", Fuel, 2013, 106, 271-278 (Year: 2013).*
International Search Report and Written Opinion in International Appln. No. PCT/US2023/035492, mailed on Feb. 27, 2024, 15 pages.
Heinzel et al., "Reforming of natural gas-hydrogen generation for small scale stationary fuel cell systems," Journal of Power Sources, 2002, 105: 202-207, 6 pages.
Saroglan, "Tar removal on dolomite and steam reforming catalyst: Benzene, toluene and xylene reforming," International Journal of Hydrogen Energy, 2012, 37: 8133-8142, 10 pages.
Smith et al., "A Review of the Water Gas Shift Reaction Kinetics," International Journal of Chemical Reactor Engineering, Jan. 2010, 8, 35 pages.

* cited by examiner

100A

100B

Figure 2:
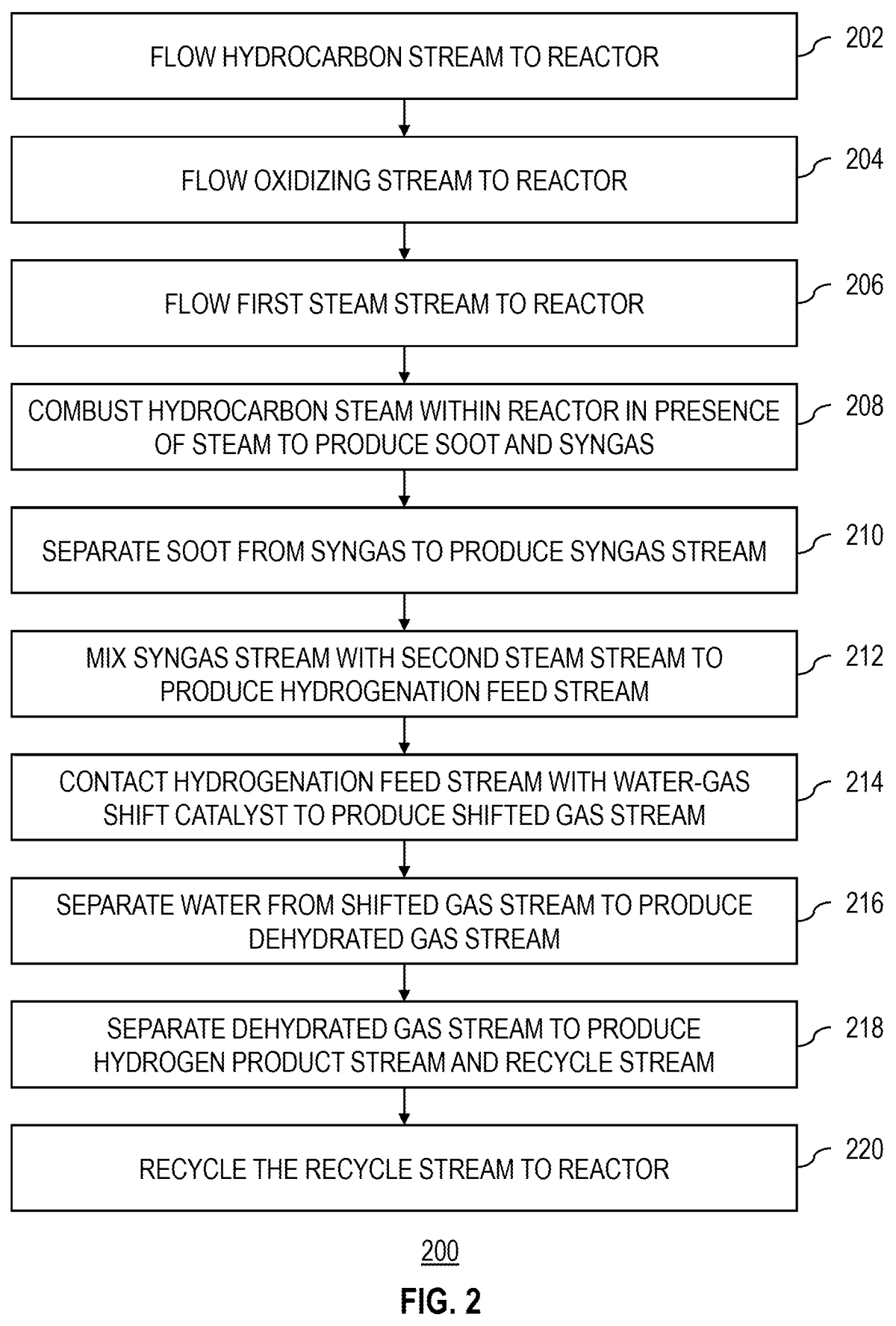

FLOW HYDROCARBON STREAM TO REACTOR — 202

FLOW OXIDIZING STREAM TO REACTOR — 204

FLOW FIRST STEAM STREAM TO REACTOR — 206

COMBUST HYDROCARBON STEAM WITHIN REACTOR IN PRESENCE OF STEAM TO PRODUCE SOOT AND SYNGAS — 208

SEPARATE SOOT FROM SYNGAS TO PRODUCE SYNGAS STREAM — 210

MIX SYNGAS STREAM WITH SECOND STEAM STREAM TO PRODUCE HYDROGENATION FEED STREAM — 212

CONTACT HYDROGENATION FEED STREAM WITH WATER-GAS SHIFT CATALYST TO PRODUCE SHIFTED GAS STREAM — 214

SEPARATE WATER FROM SHIFTED GAS STREAM TO PRODUCE DEHYDRATED GAS STREAM — 216

SEPARATE DEHYDRATED GAS STREAM TO PRODUCE HYDROGEN PRODUCT STREAM AND RECYCLE STREAM — 218

RECYCLE THE RECYCLE STREAM TO REACTOR — 220

CARBON NEUTRAL HYDROGEN PRODUCTION

TECHNICAL FIELD

This disclosure relates to carbon neutral hydrogen production.

BACKGROUND

Carbon is an abundant element in the Earth's crust. Carbon's abundance, its diversity in the makeup of organic compounds, and its ability to form polymers at temperatures commonly encountered on Earth allows this element to serve as a common element of all known life. The atoms of carbon can bond together in numerous ways, resulting in various allotropes of carbon. Some examples of allotropes of carbon include graphite, diamond, amorphous carbon, carbon nanotubes, carbon fibers, and fullerenes. The physical properties of carbon vary widely based on the allotropic form. As such, carbon is widely used across various markets at commercial or near-commercial scales.

Hydrogen is the lightest element. At standard conditions, hydrogen is a gas of diatomic molecules and is colorless, odorless, tasteless, non-toxic, and combustible. Hydrogen is the most abundant chemical substance in the universe. Most of the hydrogen on Earth exists in molecular forms, such as in water and in organic compounds (such as hydrocarbons). Some examples of uses of hydrogen include fossil fuel processing (for example, hydrocracking) and ammonia production.

There is a growing interest in the energy transition from fossil fuels to renewable energy and sustainable energy in a global effort to reduce carbon emissions. Some examples of de-carbonization pathways in the energy transition to renewable energy include increasing energy efficiency, producing and/or using lower-carbon fuels, and carbon capture and storage (CCS).

SUMMARY

This disclosure describes technologies relating to carbon neutral hydrogen production. Certain aspects of the subject matter described can be implemented as a method. A hydrocarbon stream is flowed to a reactor. The hydrocarbon stream includes at least one hydrocarbon. The hydrocarbon stream having a molar flow rate of carbon (C) and a molar flow rate of hydrogen (H). An oxidizing stream is flowed to the reactor. The oxidizing stream includes oxygen gas. The oxidizing stream has a molar flow rate of oxygen gas in a range of from 10% to 70% of C+H/4. The hydrocarbon stream is combusted within the reactor to produce soot and syngas. In some implementations, the hydrocarbon stream is combusted within the reactor in the presence of steam. Sub-stoichiometric combustion of the hydrocarbon stream within the reactor converts at least 10% of the carbon in the hydrocarbon stream into soot. The soot is separated from the syngas to produce a syngas stream. The syngas stream includes carbon dioxide, carbon monoxide, and hydrogen. In some implementations, the syngas stream includes unreacted hydrocarbon(s) originating from the hydrocarbon stream. The syngas stream is mixed with a steam stream to produce a hydrogenation feed stream. The hydrogenation feed stream is contacted with a water-gas shift catalyst in a shift reactor to convert at least a portion of the carbon monoxide and steam to carbon dioxide and hydrogen to produce a shifted gas stream. Water is separated from the shifted gas stream to produce a dehydrated gas stream. The dehydrated gas stream is separated to produce a hydrogen product stream and a recycle stream. The hydrogen product stream includes a majority of the hydrogen from the dehydrated gas stream. The recycle stream includes a remainder of the dehydrated gas stream. The recycle stream is recycled to the reactor.

This, and other aspects, can include one or more of the following features. At least a portion of heat generated from combustion of the hydrocarbon stream within the reactor can be directed to a first boiler to generate steam and cool the soot and syngas to a temperature in a range of from about 250 degrees Celsius (° C.) to about 500° C. Heat from the soot and syngas can be transferred to a second boiler to generate steam and cool the soot and syngas to a temperature in a range of from about 100° C. to about 200° C. At least a portion of the steam stream can be sourced from the steam generated by the first boiler, the steam generated by the second boiler, or both. At least a portion of the steam generated by the first boiler, at least a portion of the steam generated by the second boiler, or both can be flowed to the reactor. Separating water from the shifted gas stream can include contacting the shifted gas stream with a water stream within a quench tower and discharging a reject water stream and the dehydrated gas stream from the quench tower. Heat can be transferred from the shifted gas stream to a third boiler to generate steam prior to contacting the shifted gas stream with the water stream within the quench tower. The dehydrated gas stream can be contacted with a lean amine solvent stream within an absorber to separate carbon dioxide from the dehydrated gas stream. A rich amine solvent stream can be discharged from the absorber. Carbon dioxide can be separated from the rich amine solvent stream within a regenerator to regenerate the lean amine solvent stream. Separating carbon dioxide from the rich amine solvent stream can include boiling off the carbon dioxide from the rich amine solvent stream, thereby producing the lean amine solvent stream. The carbon dioxide separated from the rich amine solvent stream can be sequestered within a subterranean formation, such that the carbon dioxide separated from the rich amine solvent stream is not released to the atmosphere.

Certain aspects of the subject matter described can be implemented as a system. The system includes a hydrocarbon stream, an oxidizing stream, a combustion reactor, a mechanical separator, a shift reactor, a quench tower, and a purifier. The hydrocarbon stream includes at least one hydrocarbon. The hydrocarbon stream has a molar flow rate of carbon (C) and a molar flow rate of hydrogen (H). The oxidizing stream includes oxygen gas. The oxidizing stream has a molar flow rate of oxygen gas ($O_2$) in a range of from 10% to 70% of C+H/4. The combustion reactor is configured to receive the hydrocarbon stream and the oxidizing stream. The combustion reactor is configured to combust the hydrocarbon stream to produce soot and syngas. In some implementations, the combustion reactor is configured to combust the hydrocarbon stream in the presence of steam to produce soot and syngas. Sub-stoichiometric combustion of the hydrocarbon stream within the combustion reactor converts at least 10% of the carbon in the hydrocarbon stream into soot. The mechanical separator is configured to separate the soot from the syngas to produce a syngas stream. The syngas stream includes carbon dioxide, carbon monoxide, and hydrogen. In some implementations, the syngas stream includes unreacted hydrocarbon(s) originating from the hydrocarbon stream. The shift reactor is configured to receive the syngas stream and steam. The shift reactor includes a water-gas shift catalyst. The water-gas shift catalyst is configured to convert at least a portion of the carbon monoxide of the syngas stream and steam to carbon dioxide and hydrogen to produce a shifted gas stream. The quench tower is configured to receive the shifted gas stream. The quench tower is configured to separate water from the shifted gas stream to produce a dehydrated gas stream. The purifier is configured to receive the dehydrated gas stream. The purifier is configured to separate hydrogen from the dehydrated gas stream to produce a hydrogen product stream and a recycle stream. The hydrogen product stream includes a majority of the hydrogen from the dehydrated gas stream. The recycle stream includes a remainder of the dehydrated gas stream. The combustion reactor is configured to receive the recycle stream.

This, and other aspects, can include one or more of the following features. The system can include a first boiler. The first boiler can be configured to use heat generated from combustion of the hydrocarbon stream within the combustion reactor to generate steam and cool the soot and syngas to a temperature in a range of from about 250 degrees Celsius (° C.) to about 500° C. The system can include a second boiler. The second boiler can be configured to use heat from the soot and syngas to generate steam and cool the soot and syngas to a temperature in a range of from about 100° C. to about 200° C. The combustion reactor can be configured to receive at least one of the steam generated by the first boiler or the steam generated by the second boiler. The shift reactor can be configured to receive at least one of the steam generated by the first boiler or the steam generated by the second boiler. The system can include a third boiler. The third boiler can be configured to use heat from the shifted gas stream to generate steam. The third boiler can be upstream of the quench tower. The system can include an absorber. The absorber can be configured to receive the dehydrated gas stream and contact the dehydrated gas stream with a lean amine solvent stream to separate carbon dioxide from the dehydrated gas stream. The absorber can be configured to discharge a rich amine solvent stream. The rich amine solvent stream can include the carbon dioxide separated from the dehydrated gas stream. The system can include a regenerator. The regenerator can be configured to receive the rich amine solvent stream and boil off the carbon dioxide from the rich amine solvent stream to regenerate the lean amine solvent stream. The carbon dioxide boiled off from the rich amine solvent can be sequestered within a subterranean formation, such that the carbon dioxide is not released to the atmosphere.

The details of one or more implementations of the subject matter of this disclosure are set forth in the accompanying drawings and the description. Other features, aspects, and advantages of the subject matter will become apparent from the description, the drawings, and the claims.

DESCRIPTION OF DRAWINGS

FIG. 2 is a flowchart of an example method for carbon neutral hydrogen production.

DETAILED DESCRIPTION

This disclosure describes a hydrogen production process that includes sub-stoichiometric combustion of hydrocarbons and steam reforming, both occurring within the same reactor. The sub-stoichiometric combustion of hydrocarbons increases soot production for the purpose of reducing the amount of carbon dioxide produced in the combustion process. The combustion process also provides the necessary heat to the steam reforming process. The syngas produced is then processed (for example, to remove soot) and shifted in a water-gas shift reactor to convert a majority of the carbon monoxide, produced during the sub-stoichiometric combustion, into hydrogen. Residual carbon monoxide, carbon dioxide, light hydrocarbons (such as methane), and water can be recycled to the reactor for re-processing and increasing the overall efficiency of the system. In some implementations, and particularly in cases where it may not be feasible to recycle all of the carbon dioxide, an amine unit can be used to separate carbon dioxide from the hydrogen-based process stream. In such cases, the carbon dioxide separated by the amine unit can be sequestered and not released into the atmosphere as an emission allowing for a carbon neutral process.

The subject matter described in this disclosure can be implemented in particular implementations, so as to realize one or more of the following advantages. The processes and systems described can be implemented to minimize or eliminate carbon dioxide production when converting hydrocarbons into hydrogen. For example, the processes and systems described implement partial oxidation (sub-stoichiometric combustion) of hydrocarbons to specifically target maximum soot production and minimum carbon dioxide production. The soot that is produced can be processed into other useful forms of carbon and/or sold to the market. The processes and systems described implement process and heat integration, such that heat produced within the process/system can be used elsewhere in the process/system. As such, the processes and systems described can be less energy intensive in comparison to conventional hydrogen production processes.

Figure 1A:
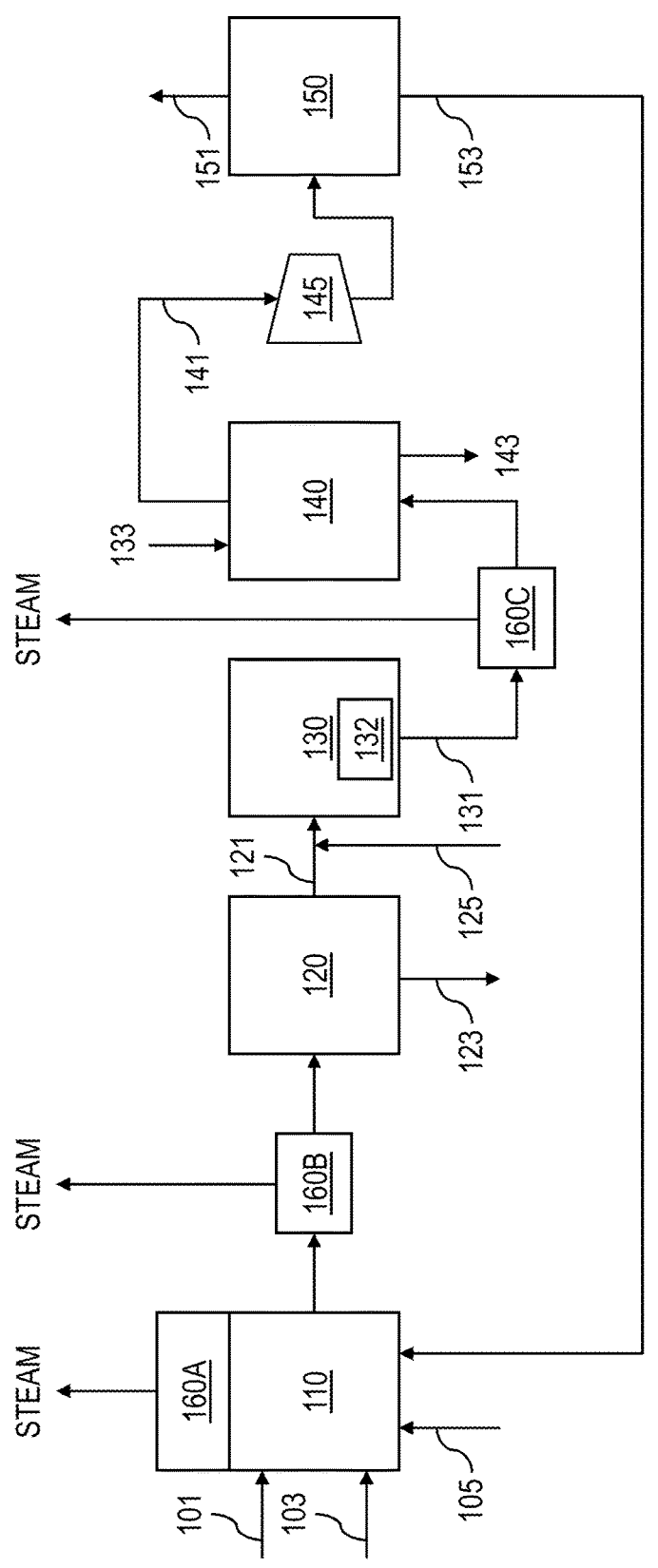
FIG. 1A is a schematic diagram of an example system for producing hydrogen.

FIG. 1A depicts an example system 100A for hydrogen production. The system 100A is carbon neutral in that carbon dioxide emissions from the system 100A are at or close to net zero. That is, all or substantially all of the carbon dioxide produced by the system 100A is subsequently used by the system 100A, such that no (or a negligible amount of) carbon dioxide is released to the atmosphere. The system 100A includes a combustion reactor 110, a mechanical separator 120, a shift reactor 130, a quench tower 140, and a purifier 150. The system 100A includes a hydrocarbon stream 101 and an oxidizing stream 103. The hydrocarbon stream 101 includes at least one hydrocarbon (for example, methane, ethane, propane, or butane). For example, the hydrocarbon stream 101 is a natural gas stream including methane. As another example, the hydrocarbon stream 101 is a liquefied petroleum gas (LPG) stream that includes propane, butane, or both. As another example, the hydrocarbon stream 101 is a liquid hydrocarbon stream that includes hydrocarbon(s) heavier than propane and/or butane. A molar flow rate of carbon in the hydrocarbon stream 101 is C. A molar flow rate of hydrogen in the hydrocarbon stream 101 is H. The oxidizing stream 103 includes oxygen gas ($O_2$). In some implementations, the oxidizing stream 103 is predominantly oxygen. In some implementations, the oxidizing stream 103 is air, which includes oxygen. A molar flow rate of oxygen gas ($O_2$) is O. The combustion reactor 110 is configured to receive the hydrocarbon stream 101 and the oxidizing stream 103 and is configured to combust the hydrocarbon stream 101 in the presence of steam to produce soot and syngas. In some implementations, the combustion reactor 110 is configured to combust the hydrocarbon stream 101 in the absence of steam to produce soot and syngas (that is, in some cases, steam is not necessary to produce the soot and syngas). In some implementations, the system 100A includes a first steam stream 105, which flows to the combustion reactor 110 to provide temperature control and replenish steam supply for steam reforming reaction(s) within the combustion reactor 110.

The ratio of oxygen in the oxidizing stream 103 to hydrocarbons in the hydrocarbon stream 101 is sub-stoichiometric in relation to combustion. Sub-stoichiometric combustion is also referred to as partial oxidation. O is in a range of from 10% to 70% of C+H/4. As one example, the hydrocarbon stream 101 can include 100 moles per hour of methane, and then for stoichiometric combustion (complete 100% combustion), the balanced chemical reaction is:

$$CH_4+2O_2 \rightarrow CO_2+2H_2O$$

In other words, for stoichiometric combustion for a methane stream, so 2 moles of oxygen gas ($O_2$) is needed per mole of methane ($CH_4$) (which confirms: C=1; H=4; C+H/4=2). For the sub-stoichiometric combustion of the hydrocarbon stream 101, the rate of oxygen flow in the oxidizing stream 103 is from 10% to 70% of the oxygen rate necessary for stoichiometric combustion. For this specific example (where the hydrocarbon stream 101 includes 100 moles per hour of methane), the oxidizing stream 103 includes from 20 moles per hour (10%) to 140 moles per hour (70%) of oxygen gas ($O_2$).

Providing a sub-stoichiometric ratio of oxygen to hydrocarbons in the combustion reactor 110 increases the rate of soot production within the combustion reactor 110, which in turn reduces the rate of carbon dioxide production within the combustion reactor 110. The combustion reactor 110 is configured to convert at least 10% of the carbon in the hydrocarbon stream 101 into soot (as opposed to carbon dioxide) as a result of the sub-stoichiometric combustion of the hydrocarbon stream 101 within the combustion reactor 110. In some implementations, the combustion reactor 110 is configured to convert at least 20%, at least 30%, at least 40%, or at least 50% of the carbon in the hydrocarbon stream 101 into soot as a result of the sub-stoichiometric combustion of the hydrocarbon stream 101 within the combustion reactor 110. For example, the combustion reactor 110 is configured to convert from about 10% to about 80%, from about 20% to about 70%, from about 30% to about 60%, from about 40% to about 50% of the carbon in the hydrocarbon stream 101 into soot as a result of the sub-stoichiometric combustion of the hydrocarbon stream 101 within the combustion reactor 110.

The mechanical separator 120 receives the soot and the syngas that was produced in the combustion reactor 110. The mechanical separator 120 is configured to separate the soot from the syngas to produce a syngas stream 121. The syngas stream 121 includes carbon dioxide, carbon monoxide, and hydrogen. In some implementations, the syngas stream 121 includes unreacted hydrocarbons originating from the hydrocarbon stream 101, such as methane and/or other hydrocarbon(s). The mechanical separator 120 can capitalize on the effects of gravity to separate the soot from the syngas by taking advantage of the difference in density of the components. The mechanical separator 120 can include, for example, a cyclonic separator. In some implementations, the mechanical separator 120 includes a filter (such as a bag filter) that allows gaseous components (such as the syngas) to pass through the filter while preventing solid components (such as the soot) from passing through the filter to separate the soot from the syngas. In some implementations, the mechanical separator 120 includes a water spray injection and/or a wash column that can facilitate coalescence of the soot particles to more easily separate the soot from the syngas. The soot 123 that is separated from the mechanical separator 120 can be disposed, used for power generation, or processed, for example, to produce useful forms of carbon, such as carbon black, synthetic graphite, carbon filaments/fiber, and/or carbon nanostructures (such as carbon nanotubes or carbon nanofibers). In some implementations, the system 100A includes a preheater (not shown) downstream of the mechanical separator 120 and upstream of the shift reactor 130. In cases where the system 100A includes the preheater, the preheater can re-heat the syngas stream 121 to an operating temperature suitable for promoting the shift reaction(s) occurring in the shift reactor 130. The preheater can, for example, utilize steam to re-heat the syngas stream 121. The steam can be sourced, for example, from any of the first, second, or third boilers 160A, 160B, or 160C.

The shift reactor 130 is configured to receive the syngas stream 121. In some implementations, the system 100A includes a second steam stream 125 that also flows to the shift reactor 130. In cases where the second steam stream 125 is provided to the shift reactor 130, a mass ratio of steam in the second steam stream 125 to hydrocarbons (for example, methane) in the hydrocarbon stream 101 can be in a range of from about 3:1 to about 5:1. In some implementations, the second steam stream 125 mixes with the syngas stream 121 before entering the shift reactor 130. In some implementations, the second steam stream 125 and the syngas stream 121 separately enter the shift reactor 130 and mix within the shift reactor 130. The shift reactor 130 includes a water-gas shift catalyst 132 that is configured to convert at least a portion of the carbon monoxide of the syngas stream 121 and steam from the second steam stream 125 to carbon dioxide and hydrogen to produce a shifted gas stream 131. Thus, the shifted gas stream 131 exiting the shift reactor 130 includes more carbon dioxide, more hydrogen, and less carbon monoxide in comparison to the syngas stream 121 entering the shift reactor 130. Because the water-gas shift reaction is exothermic, the shifted gas stream 131 exiting the shift reactor 130 is typically higher in temperature in comparison to the syngas stream 121 entering the shift reactor 130. The second steam stream 125 not only provides a source of water for facilitating the production of carbon dioxide and hydrogen, but can also provide temperature regulation in the shift reactor 130.

In some implementations, the shift reactor 130 includes a pair of reactors with one of the reactors operating at a higher temperature in comparison to the other reactor. For example, a first shift reactor can operate at a temperature in a range of from about 350 degrees Celsius (° C.) to about 450° C., while the second shift reactor can operate at a temperature in a range of from about 180° C. to about 300° C. In some implementations, the first shift reactor includes a first water-gas shift catalyst, and the second shift reactor includes a second water-gas shift catalyst. In some implementations, the first and second water-gas shift catalysts are the same. In some implementations, the first water-gas shift catalyst includes iron oxide, chromium oxide, magnesium oxide, or any combination of these. In some implementations, the second water-gas shift catalyst includes copper, copper oxide, zinc oxide, aluminum oxide, or any combination of these. In some implementations, the second water-gas shift catalyst is loaded on a ceramic support or an alumina support.

In some implementations, the shift reactor 130 is configured to convert at least 80%, at least 85%, at least 90%, or at least 95% of the carbon monoxide (CO) in the syngas stream 121 into carbon dioxide ($CO_2$). In some implementations, a molar ratio of hydrogen ($H_2$) to carbon monoxide (CO) in the shifted gas stream 131 exiting the shift reactor 130 is in a range of from 30:1 to 60:1. In some implementations, a molar ratio of hydrogen ($H_2$) to carbon dioxide ($CO_2$) in the shifted gas stream 131 exiting the shift reactor 130 is in a range of from 3:2 to 5:2. In some implementations, a molar ratio of hydrogen ($H_2$) to water ($H_2O$), for example, in the form of water vapor) in the shifted gas stream 131 exiting the shift reactor 130 is in a range of from 3:2 to 5:2. In some implementations, a molar ratio of carbon dioxide ($CO_2$) to water ($H_2O$) in the shifted gas stream 131 exiting the shift reactor 130 is in a range of from 1:2 to 3:2. For example, a molar ratio of hydrogen ($H_2$) to carbon monoxide (CO) to carbon dioxide ($CO_2$) to water ($H_2O$) in the shifted gas stream 131 exiting the shift reactor 130 is about 51:1:23:25.

The quench tower 140 is configured to receive the shifted gas stream 131 and separate water (for example, bulk water phase) from the shifted gas stream 131 to produce a dehydrated gas stream 141. In some implementations, the quench tower 140 receives a water stream 133, and the quench tower 140 contacts the shifted gas stream 131 with the water stream 133. Contacting the shifted gas stream 131 with the water stream 133 causes the shifted gas stream 131 to cool and also causes water in the shifted gas stream 131 (for example, in the form of water vapor) to condense and transfer to the water stream 133. The dehydrated gas stream 141 and a reject water stream 143 discharge from the quench tower 140. The dehydrated gas stream 141 exiting the quench tower 140 has a lower temperature in comparison to the shifted gas stream 131 entering the quench tower 140. In some implementations, the dehydrated gas stream 141 exiting the quench tower 140 has an operating temperature in a range of from about 43° C. to about 60° C. The dehydrated gas stream 141 exiting the quench tower 140 has a lower water content in comparison to the shifted gas stream 131 entering the quench tower 140. In some implementations, the dehydrated gas stream 141 is substantially free of water.

The purifier 150 is configured to receive the dehydrated gas stream 141 and separate hydrogen from the dehydrated gas stream 141 to produce a hydrogen product stream 151 and a recycle stream 153. In some implementations, the system 100A includes a compressor 145 upstream of the purifier 150 to facilitate flow of the dehydrated gas stream 141 to the purifier 150. In some implementations, the compressor 145 is configured to pressurize the dehydrated gas stream 141 to an operating pressure in a range of from about 1,000 kilopascals (kPa) to about 7,000 kPa. The hydrogen product stream 151 includes a majority of the hydrogen from the dehydrated gas stream 141. In some implementations, the hydrogen product stream 151 has a hydrogen content of at least 95 volume percent (vol. %), at least 96 vol. %, at least 97 vol. %, at least 98 vol. %, at least 99 vol. %, at least 99.5 vol. %, at least 99.9 vol. %, or at least 99.99 vol. %. The recycle stream 153 includes a remainder of the dehydrated gas stream 141. For example, the recycle stream 153 can include carbon monoxide, carbon dioxide, and any hydrocarbon(s) that may have carried over through the system 100A without being combusted in the combustion reactor 110. In some implementations, the system 100A produces about 0.1 kilograms (kg) to about 5 kg of carbon dioxide ($CO_2$) per 1 kg of hydrogen ($H_2$). That is, in some implementations, a mass ratio of carbon dioxide ($CO_2$) in the recycle stream 153 to hydrogen ($H_2$) in the hydrogen product stream 151 is in a range of from about 0.1:1 to about 5:1. The recycle stream 153 can be recycled back to the combustion reactor 110. By recycling the recycle stream 153 back to the combustion reactor 110, carbon dioxide that has been produced in the system 100A can be recycled within the system 100A without being released to the atmosphere and therefore avoid increasing emissions. In this way, the system 100A is a carbon neutral system. In some implementations, the purifier 150 includes a membrane (for example, a polymer membrane) that selectively allows hydrogen to pass through (or pass more quickly in comparison to other components), such that the hydrogen can be separated from the remaining components of the dehydrated gas stream 141. In some implementations, the purifier 150 includes a pair of vessels including an adsorbent, and the pair of vessels implement a pressure swing adsorption process to separate hydrogen from the remaining components of the dehydrated gas stream 141.

The system 100A can include a boiler to utilize heat generated in the system 100A to generate steam. In some implementations, as shown in FIG. 1A, the system 100A includes a first boiler 160A, a second boiler 160B, and a third boiler 160C. Although shown in FIG. 1A as including three boilers (160A, 160B, 160C), the system 100A can optionally include fewer boilers (for example, no boilers, one boiler, or two boilers) or additional boilers (for example, four boilers, five boilers, or more than five boilers). Each of the boilers (160A, 160B, 160C) can generate steam at varying operating pressures based on the quality of heat (for example, level of temperature) available in the system 100A. For example, the first boiler 160A can be configured to use heat generated from the sub-stoichiometric combustion of the hydrocarbon stream 101 within the combustion reactor 110 to generate steam. In using the heat from the combustion reactor 110, the first boiler 160A can cool the soot and syngas to a temperature in a range of from about 250° C. to about 500° C. In some implementations, as shown in FIG. 1A, the first boiler 160A is coupled to or at least partially reside within the combustion reactor 110 to receive heat from the combustion reactor 110. For example, the second boiler 160B can be configured to use heat from the soot and syngas to generate steam. In using the heat from the soot and syngas, the second boiler 160B can cool the soot and syngas to a temperature in a range of from about 100° C. to about 200° C. In some implementations, as shown in FIG. 1A, the second boiler 160B is located upstream of the mechanical separator 120. For example, the third boiler 160C can be configured to use heat from the shifted gas stream 131 to generate steam. In some implementations, as shown in FIG. 1A, the third boiler 160C is located downstream of the shift reactor 130 and upstream of the quench tower 140. The steam streams 105 and 125 can be at least partially sourced from any one or more of the boilers 160A, 160B, 160C, depending on the operating condition requirements for the respective steam streams 105 and 125. For example, the first steam stream 105 that is provided for the combustion reactor 110 can be at least partially sourced from the first boiler 160A, the second boiler 160B, the third boiler 160C, or any combination of these. For example, the second steam stream 125 that is provided for the shift reactor 130 can be at least partially sourced from the first boiler 160A, the second boiler 160B, the third boiler 160C, or any combination of these.

Figure 1B:
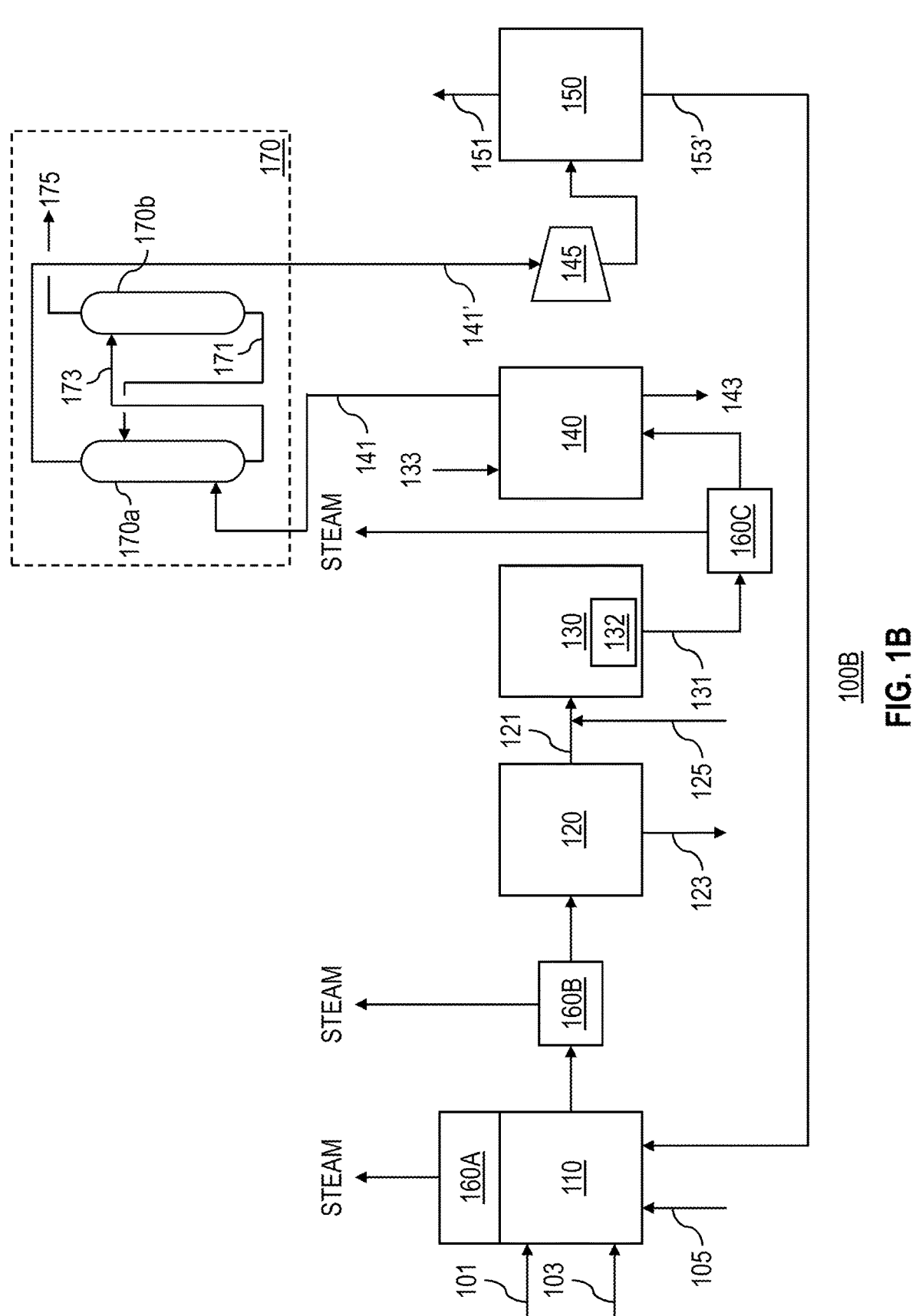
FIG. 1B is a schematic diagram of an example system for producing hydrogen.

FIG. 1B depicts an example system 100B for hydrogen production. The system 100B is carbon neutral and can be substantially similar to the system 100A shown in FIG. 1A.

In addition to the components of system 100A, the system 100B includes an amine treater 170. The amine treater 170 includes an absorber 170a and a regenerator 170b. The absorber 170a is configured to receive the dehydrated gas stream 141 and contact the dehydrated gas stream 141 with a lean amine solvent stream 171. The lean amine solvent stream 171 has a high affinity for carbon dioxide. As the lean amine solvent stream 171 contacts the dehydrated gas stream 141, the carbon dioxide separates from the dehydrated gas stream 141 and dissolves in the lean amine solvent stream 171. The dehydrated gas stream 141' exiting the absorber 170a is substantially free of carbon dioxide and continues onto the purifier 150 for separating out the hydrogen product stream 151. In this case, because the carbon dioxide has been separated from the dehydrated gas stream 141', the recycle stream 153' is also substantially free of carbon dioxide.

The lean amine solvent stream 171 that has absorbed the carbon dioxide is then considered a rich amine solvent stream 173, which discharges from the absorber 170a. The regenerator 170b is configured to receive the rich amine solvent stream 173 and boil off the carbon dioxide from the rich amine solvent stream 173 to regenerate the lean amine solvent stream 171. The regenerator 170b can be, for example, a distillation column that fractionates the rich amine solvent stream 173 to produce the lean amine solvent stream 171 as a bottoms product and a carbon dioxide stream 175 as a distillate. The lean amine solvent stream 171 is recycled to the absorber 170a. The system 100B can be particularly useful in cases in which the amount of carbon dioxide produced in the system 100B is too large for fully recycling the carbon dioxide in the system 100B. The carbon dioxide stream 175 exiting the regenerator 170b can be sequestered, for example, within a subterranean formation, such that the carbon dioxide is not released to the atmosphere. Thus, carbon dioxide emissions can also be avoided by implementation of system 100B. In some implementations, at least a portion of the carbon dioxide stream 175 is recycled back to the combustion reactor 110.

Although not shown in FIGS. 1A and 1B, the systems 100A, 100B can (and are expected to) include the typical components included in similar systems. For example, in each of the configurations described, process streams (also referred to as "streams") are flowed within each unit and between units of the respective system. The process streams can be flowed using one or more flow control systems implemented throughout the respective system. A flow control system can include one or more flow pumps to pump the liquid process streams, one or more blowers and/or compressors to flow the gaseous process streams, one or more flow pipes through which the process streams are flowed, and one or more flow elements (such as valves and orifice plates) to regulate the flow of streams through the pipes.

In some implementations, a flow control system can be operated manually. For example, an operator can set a flow rate for each pump by changing the position of a valve (open, partially open, or closed) to regulate the flow of the process streams through the pipes in the flow control system. Once the operator has set the flow rates and the valve positions for all flow control systems distributed across the respective system, the flow control system can flow the streams within a unit or between units under constant flow conditions, for example, constant volumetric or mass flow rates. To change the flow conditions, the operator can manually operate the flow control system, for example, by changing the valve position.

In some implementations, a flow control system can be operated automatically. For example, the flow control system can be connected to a computer system to operate the flow control system. The computer system can include a computer-readable medium storing instructions (such as flow control instructions) executable by one or more processors to perform operations (such as flow control operations). For example, an operator can set the flow rates by setting the valve positions for all flow control systems distributed across the respective system using the computer system. In such implementations, the operator can manually change the flow conditions by providing inputs through the computer system. In such implementations, the computer system can automatically (that is, without manual intervention) control one or more of the flow control systems, for example, using feedback systems implemented in one or more units and connected to the computer system. For example, a sensor (such as a pressure sensor or temperature sensor) can be connected to a pipe through which a process stream flows. The sensor can monitor and provide operating conditions (such as a pressure or temperature) of the process stream to the computer system. In response to the operating condition deviating from a set point (such as a target pressure value or target temperature value) or exceeding a threshold (such as a threshold pressure value or threshold temperature value), the computer system can automatically perform operations to adjust properties of the flow control system. For example, if the pressure or temperature in the pipe exceeds the threshold pressure value or the threshold temperature value, respectively, the computer system can provide a signal to open a valve to relieve pressure or a signal to shut down process stream flow.

FIG. 2 is a flow chart of an example method 200 for carbon neutral hydrogen production. The system 100A or 100B can, for example, implement the method 200. At block 202, a hydrocarbon stream (such as the hydrocarbon stream 101) is flowed to a reactor (such as the combustion reactor 110). As described previously, the hydrocarbon stream 101 includes at least one hydrocarbon, such as methane and ethane. A molar flow rate of carbon in the hydrocarbon stream is C. A molar flow rate of hydrogen in the hydrocarbon stream is H. At block 204, an oxidizing stream (such as the oxidizing stream 103) is flowed to the combustion reactor 110. The oxidizing stream 103 includes oxygen gas ($O_2$). A molar flow rate of oxygen gas ($O_2$) in the oxidizing stream 103 is in a range of from 10% to 70% of C+H/4. At block 206, a first steam stream (such as the first steam stream 105) is flowed to the combustion reactor 110. At block 208, the hydrocarbon stream 101 is combusted sub-stoichiometrically (partial oxidation) within the combustion reactor 110 in the presence of the steam (for example, from the first steam stream 105) to produce soot and syngas. At least 10% of the carbon in the hydrocarbon stream 101 is converted into soot as a result of the sub-stoichiometric combustion of the hydrocarbon stream 101 within the combustion reactor 110 at block 208. In some implementations, at least a portion of heat generated from combustion of the hydrocarbon stream 101 within the combustion reactor 110 at block 208 is directed to a first boiler (such as the first boiler 160A) to generate steam and cool the soot and syngas to a temperature in a range of from about 250° C. to about 500° C. In some implementations, heat is transferred from the soot and syngas to a second boiler (such as the second boiler 160B) to generate steam and cool the soot and syngas to a temperature in a range of from about 100° C. to about 200° C. At block 210, the soot is separated from the syngas to produce a syngas stream (such as the syngas stream 121).

The mechanical separator 120, for example, can implement block 210. As described previously, the syngas stream 121 includes carbon dioxide, carbon monoxide, and hydrogen (and in some cases, unreacted hydrocarbon(s)). At block 212, the syngas stream 121 is mixed with a second steam stream (such as the second steam stream 125) to produce a hydrogenation feed stream. At block 214, the hydrogenation feed stream is contacted with a water-gas shift catalyst in a shift reactor (such as the shift reactor 130) to convert at least a portion of the carbon monoxide and steam to carbon dioxide and hydrogen to produce a shifted gas stream (such as the shifted gas stream 131). In some implementations, heat is transferred from the shifted gas stream 131 to a third boiler (such as the third boiler 160C) to generate steam, prior to moving onto block 216. At block 216, water is separated from the shifted gas stream 131 to produce a dehydrated gas stream (such as the dehydrated gas stream 141). The quench tower 140, for example, can implement block 216. For example, separating water from the shifted gas stream 131 at block 216 can include contacting the shifted gas stream 131 with a water stream within the quench tower 140 and discharging a reject water stream and the dehydrated gas stream 141 from the quench tower 140. At block 218, the dehydrated gas stream 141 is separated to produce a hydrogen product stream (such as the hydrogen product stream 151) and a recycle stream (such as the recycle stream 153). The purifier 150, for example, can implement block 218. As described previously, the hydrogen product stream 151 includes a majority of the hydrogen from the dehydrated gas stream 141, and the recycle stream 153 includes a remainder of the dehydrated gas stream 141. At block 220, the recycle stream 153 is recycled to the combustion reactor 110.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method comprising:

flowing a hydrocarbon stream to a reactor, the hydrocarbon stream comprising at least one hydrocarbon;

flowing an oxidizing stream to the reactor, the oxidizing stream comprising oxygen gas and having a molar flow rate of oxygen gas in a range of from 10% to 70% of $C+H/4$, wherein C is a molar flow rate of carbon (C) of the hydrocarbon stream, and H is a molar flow rate of hydrogen (H) of the hydrocarbon stream;

combusting the hydrocarbon stream within the reactor to produce soot and syngas, wherein sub-stoichiometric combustion of the hydrocarbon stream within the reactor converts at least 20% of the carbon in the hydrocarbon stream into soot;

separating the soot from the syngas to produce a syngas stream comprising carbon dioxide, carbon monoxide, and hydrogen;

mixing the syngas stream with a steam stream to produce a hydrogenation feed stream;

contacting the hydrogenation feed stream with a water-gas shift catalyst in a shift reactor to convert at least a portion of the carbon monoxide and steam to carbon dioxide and hydrogen to produce a shifted gas stream;

separating water from the shifted gas stream to produce a dehydrated gas stream;

separating the dehydrated gas stream to produce a hydrogen product stream and a recycle stream, the hydrogen product stream comprising a majority of the hydrogen from the dehydrated gas stream, and the recycle stream comprising a remainder of the dehydrated gas stream; and recycling the recycle stream to the reactor.

2. The method of claim 1, comprising directing at least a portion of heat generated from combustion of the hydrocarbon stream within the reactor to a first boiler to generate steam and cool the soot and syngas to a temperature in a range of from about 250 degrees Celsius (° C.) to about 500° C.

3. The method of claim 2, comprising transferring heat from the soot and syngas to a second boiler to generate steam and cool the soot and syngas to a temperature in a range of from about 100° C. to about 200° C.

4. The method of claim 3, wherein at least a portion of the steam stream is sourced from the steam generated by the first boiler, the steam generated by the second boiler, or both.

5. The method of claim 3, wherein at least a portion of the steam generated by the first boiler, at least a portion of the steam generated by the second boiler, or both are flowed to the reactor.

6. The method of claim 5, wherein separating water from the shifted gas stream comprises contacting the shifted gas stream with a water stream within a quench tower and discharging a reject water stream and the dehydrated gas stream from the quench tower.

7. The method of claim 6, comprising transferring heat from the shifted gas stream to a third boiler to generate steam prior to contacting the shifted gas stream with the water stream within the quench tower.

8. The method of claim 6, comprising contacting the dehydrated gas stream with a lean amine solvent stream within an absorber to separate carbon dioxide from the dehydrated gas stream and discharging a rich amine solvent stream from the absorber.

9. The method of claim 8, comprising separating carbon dioxide from the rich amine solvent stream within a regenerator to regenerate the lean amine solvent stream, wherein separating carbon dioxide from the rich amine solvent stream comprises boiling off the carbon dioxide from the rich amine solvent stream, thereby producing the lean amine solvent stream.

10. The method of claim 9, comprising sequestering, within a subterranean formation, the carbon dioxide separated from the rich amine solvent stream, such that the carbon dioxide separated from the rich amine solvent stream is not released to the atmosphere.

11. The method of claim 1, wherein sub-stoichiometric combustion of the hydrocarbon stream within the reactor converts at least 30% of the carbon in the hydrocarbon stream into soot.

12. The method of claim 1, wherein sub-stoichiometric combustion of the hydrocarbon stream within the reactor converts at least 40% of the carbon in the hydrocarbon stream into soot.

13. The method of claim 1, wherein sub-stoichiometric combustion of the hydrocarbon stream within the reactor converts at least 50% of the carbon in the hydrocarbon stream into soot.

14. The method of claim 1, wherein sub-stoichiometric combustion of the hydrocarbon stream within the reactor converts from about 30% to about 60% of the carbon in the hydrocarbon stream into soot.

* * * * *